(12) United States Patent
Iwamoto et al.

(10) Patent No.: US 9,793,646 B2
(45) Date of Patent: Oct. 17, 2017

(54) ELECTRONIC DEVICE

(71) Applicant: Panasonic Corporation, Osaka (JP)

(72) Inventors: Akira Iwamoto, Osaka (JP); Tadashi Matsunobe, Osaka (JP); Masaru Furujiku, Osaka (JP); Jun Satoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 602 days.

(21) Appl. No.: 13/964,422

(22) Filed: Aug. 12, 2013

(65) Prior Publication Data

US 2014/0185210 A1 Jul. 3, 2014

(30) Foreign Application Priority Data

Dec. 27, 2012 (JP) ................................. 2012-284797

(51) Int. Cl.
*H01R 13/52* (2006.01)
*G06F 1/16* (2006.01)

(52) U.S. Cl.
CPC ....... *H01R 13/5213* (2013.01); *G06F 1/1626* (2013.01); *G06F 1/1656* (2013.01); *H01R 2201/06* (2013.01)

(58) Field of Classification Search
CPC .. H01R 13/5213; H01R 13/52; H01R 13/443; H01R 13/447; H01R 13/453; G06F 1/1656; G06F 1/1626
USPC .................................................... 361/679.02
See application file for complete search history.

(56) References Cited

U.S. PATENT DOCUMENTS

| | | | |
|---|---|---|---|
| 5,320,542 A * | 6/1994 | Cheng ................ | H01R 13/443 174/67 |
| 5,583,742 A | 12/1996 | Noda et al. | |
| 7,083,439 B1 * | 8/2006 | Hayakawa .......... | H01R 13/443 439/136 |
| 7,106,580 B2 | 9/2006 | Kugimiya et al. | |

(Continued)

FOREIGN PATENT DOCUMENTS

| | | |
|---|---|---|
| JP | 7-168646 A | 7/1995 |
| JP | 2005-165475 | 6/2005 |

OTHER PUBLICATIONS

Office Action issued in corresponding Japanese Patent Application No. 2012-284797 dated Mar. 22, 2016 (3 pages).

*Primary Examiner* — Hoa C Nguyen
*Assistant Examiner* — Christopher L Augustin
(74) *Attorney, Agent, or Firm* — Hamre, Schumann, Mueller & Larson, P.C.

(57) ABSTRACT

There is provided an electronic device includes a terminal port disposed at a side surface of a casing, and a cap for covering the terminal port in an openable and closable manner, wherein the cap includes a fitting portion for fitting into the terminal port, a pressing surface exposed on the side surface of the casing, and a cap-turning support configured to support the cap in the openable and closable manner with respect to the terminal port, the pressing surface of the cap is perpendicular to a fitting direction of the cap into the terminal port, and a portion located above and/or below the terminal port in the side surface of the casing constitutes a first protrusion configured to outwardly protrude in an arc-like shape from the side surface of the casing more than the pressing surface in a state where the cap is closed.

5 Claims, 4 Drawing Sheets

(56) References Cited

U.S. PATENT DOCUMENTS

| | | | |
|---|---|---|---|
| 7,447,532 B2* | 11/2008 | Hsu ............................. | 455/575.8 |
| D623,651 S * | 9/2010 | Hsu ............................. | D14/439 |
| 7,903,396 B2* | 3/2011 | Sasaki ................ | H05K 5/0239 |
| | | | 361/679.01 |
| 7,938,260 B2* | 5/2011 | Lin ............................. | 206/320 |
| D675,604 S * | 2/2013 | Limber ....................... | D14/250 |
| 8,403,136 B1* | 3/2013 | Tsai ............................ | 206/320 |
| 8,488,305 B2* | 7/2013 | Harada ................ | G06F 1/1613 |
| | | | 166/338 |
| 8,774,882 B2* | 7/2014 | Tages et al. ............... | 455/575.8 |
| 2005/0130470 A1 | 6/2005 | Kugimiya et al. | |
| 2006/0154520 A1* | 7/2006 | Gennai ............... | H01R 13/447 |
| | | | 439/578 |
| 2007/0281556 A1* | 12/2007 | Elliott ...................... | H01R 4/36 |
| | | | 439/798 |
| 2007/0284229 A1* | 12/2007 | Chen .................... | H01R 13/447 |
| | | | 200/43.18 |
| 2008/0139258 A1* | 6/2008 | Park ..................... | H01R 13/447 |
| | | | 455/575.1 |
| 2009/0262489 A1* | 10/2009 | Lin .................... | H01R 13/5213 |
| | | | 361/679.01 |
| 2010/0053851 A1* | 3/2010 | Bernstein ........... | A61B 5/14532 |
| | | | 361/679.01 |
| 2010/0309613 A1* | 12/2010 | Zuo ..................... | H01R 13/447 |
| | | | 361/679.01 |
| 2012/0019992 A1* | 1/2012 | Zhang ................. | H01R 13/443 |
| | | | 361/679.01 |
| 2012/0298536 A1* | 11/2012 | Rauta et al. .................. | 206/301 |
| 2013/0134024 A1* | 5/2013 | Cheng ................... | H01H 13/86 |
| | | | 200/5 A |
| 2013/0284681 A1* | 10/2013 | Tsai ............................... | 211/26 |

\* cited by examiner

ELECTRONIC DEVICE

BACKGROUND OF THE DISCLOSURE

Field of the Invention

The present disclosure relates to an electronic device and, more particularly, to an electronic device that is provided with a terminal port at a side surface of the casing thereof.

Description of the Related Art

As well known, an electronic device such as a personal computer and an information terminal device, in particular, a portable electronic device such as a so-called tablet type or a notebook type computer and a tablet type mobile information terminal is generally provided with a terminal port at a side surface of the casing thereof. The terminal port is provided with a connection terminal to be connected to an external relevant device, a power source or the like.

While, at the side surfaces of the chassis and the vicinity thereof, in general, various kinds of mechanisms and/or components such as various kinds of operation switches, ventilation slot for a cooling fun, antennae and the like are arranged. Accordingly, when the terminal port is arranged on the side surfaces of the chassis, it is required to avoid the interference with the above various kinds of mechanisms and/or components, in addition to the interference with various kinds of devices accommodated inside the chassis and/or a battery pack equipped to the chassis. Therefore, arrangement area of the terminal port is considerably limited, and in some cases, it has to be arranged at a vicinity of a corner of the chassis.

For example, Japanese Patent Laid-open Publication No. 2005-165475 discloses a constitution of corners of the chassis in a portable electronic apparatus, wherein the chassis is formed to have a substantially rectangular basic shape in their entirety in a plan view, and a bulge portion bulging outwardly is provided at each of four corners, thereby aiming particular to enhance the impact resistance when the apparatus is subject to an impact such as a dropping impact.

SUMMARY OF THE DISCLOSURE

The aforementioned terminal port may be requested to be shielded by covering with a cover member such as a cap, in order to prevent dust and/or liquid such as water from entering thereto when the terminal port is not in use. In arranging such the cap, it may be convenient to integrally provide it onto the side surface of the chassis through an opening and closing support mechanism such as a hinge mechanism, and to enable the turning operation for opening and closing the terminal port as needed basis.

However, when the cap is integrally provided onto the side surface of the chassis as explained above, the turning operation of the cap is generally not easy since it is limited within a small space at the side surface of the chassis. For example, when the cap is pushed into the terminal port by exerting a pushing force on the opened cap, a user is required to conduct the turning operation in searching for a suitable portion for exerting the pushing force. In particular, when the terminal port is arranged at the vicinity of a corner of the chassis, further especially, when the bulge portion is provided at the corner, the difficulty of the turning operation of the cap become to be more remarkable.

To cope therewith, One non-limiting and exemplary embodiment provides an electronic device capable of enhancing the operability in turning operation of the cap when the cap is turned to close the terminal port, in the case where the cap configured to openably covers the terminal port by a turning operation thereof is integrally provided onto the side surface of the chassis, in the electronic device having a terminal port opened outward at the side surface of the casing.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to one general aspect of the present disclosure, there is provided an electronic device including: a casing having, at an outer surface thereof, an upper surface and a lower surface that are disposed opposite to each other, and side surfaces for joining peripheral edges of the upper and lower surfaces; a terminal port disposed at the side surface of the casing and opened outward of the casing; and a cap configured to cover the terminal port in an openable and closable manner. The cap includes a fitting portion capable of fitting into the terminal port, a pressing surface which is exposed on the side surface of the casing, and a cap-turning support configured to support the cap in the openable and closable manner with respect to the terminal port. The pressing surface of the cap is perpendicular to a fitting direction of the cap into the terminal port. And a portion located above and/or below the terminal port in the side surface of the casing constitutes a first protrusion configured to outwardly protrude in an arc-like shape from the side surface of the casing more than the pressing surface in a state where the cap is closed.

With the electronic device according to the present disclosure, in the case where the cap configured to openably covers the terminal port by a turning operation thereof is integrally provided onto the side surface of the chassis, in the electronic device having a terminal port opened outward at the side surface of the casing, the cap includes a fitting portion capable of fitting into the terminal port, a pressing surface which is exposed on the side surface of the casing, and a cap-turning support configured to support the cap in the openable and closable manner with respect to the terminal port. And the pressing surface of the cap is perpendicular to a fitting direction of the cap into the terminal port. Accordingly, when the cap is pushed into the terminal port by exerting a pushing force on the opened cap, a user can detect the suitable portion for exerting the pushing force without particularly realizing it. Thereby, it becomes possible to enhance the operability in turning operation of the cap when the opened cap is turned to close the terminal port.

DETAILED DESCRIPTION

Figure 1:
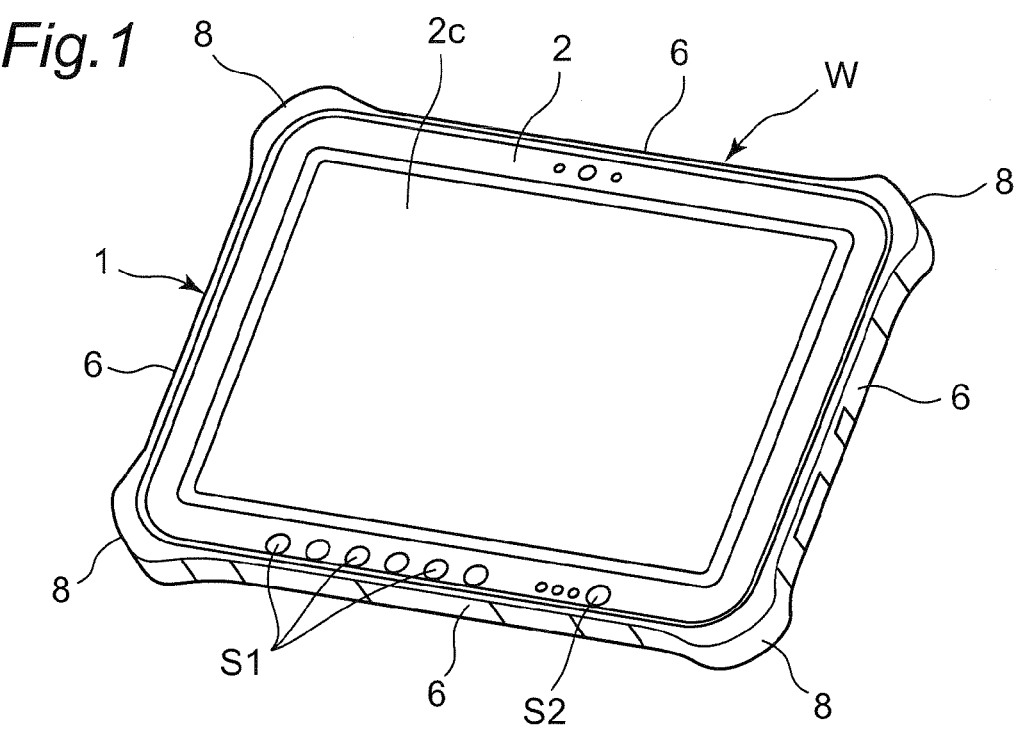
FIG. 1 is a perspective view illustrating a tablet terminal device on a display screen side according to an embodiment of the present disclosure.

An electronic device according to the present disclosure can be embodied in aspects below in addition to the aforementioned basic structure. Specifically, in the aforementioned electronic device, a portion located above and/or below the pressing surface of the cap may constitute a second protrusion configured to outwardly protrude in an arc-like shape and in a same direction as that of the first protrusion from the pressing surface in a state where the cap is closed.

With this structure, since the second protrusion is formed at the portion located above and/or below the pressing surface of the cap, the user's finger is to touch to the second protrusion when the cap is pushed into the terminal port by exerting a pushing force on the opened cap by the user's finger. Thereby, it becomes possible for the user to more easily detect the position of the pressing surface.

In this case, an outer surface of the first protrusion and an outer surface of the second protrusion may constitute a substantially common outer surface in a state where the cap is closed.

With this structure, since the outer surface of the first protrusion provided to the casing and the outer surface of the second protrusion provided to the cap constitute the substantially common outer surface in a state where the cap is closed, no step is substantially formed between the outer surface of the casing side and the outer surface of the cap side in a state where the cap is closed. And, even when the pressing surface is provided to the cap, it is possible to suppress an adverse effect to the appearance of the electronic device in a state where the cap is closed.

Further, the above-mentioned first and the second protrusions may be made of a material having a higher elasticity than that of a material of other portions of the upper surface or the lower surface of the casing.

With this structure, since the first protrusion provided to the casing and the second protrusion provided to the cap are made of the material having the higher elasticity than that of the material of other portions of the upper surface or the lower surface of the casing, it is possible to effectively absorb an impact force and enhance the impact resistance when the impact force is applied to the portion of the casing to which the terminal port and the cap are provided.

Furthermore, the upper surface and the lower surface of the casing may respectively be formed into a substantially quadrangular shape as viewed on a plane, and the side surfaces may be configured to have two pairs of substantially flat surfaces disposed opposite to each other. And each corner of the quadrangular shape may be constituted by a bulge portion configured to bulge outward of the casing, and a part of the bulge portion may constitute the first protrusion.

With this structure, each of the four corners of the casing formed into the quadrangular shape as viewed on a plane is provided with the bulge portion configured to bulge outward of the casing, and a part of the bulge portion may constitute the first protrusion. Thereby, even when the terminal port and the cap are arranged at one of the aforementioned corner, it is possible to enhance the impact resistance when the electronic device is subject to an impact such as a dropping impact.

Still further, a sealing member for sealing the terminal port of the casing may be disposed on an outer periphery of the fitting portion of the cap.

With this structure, it is possible to more reliably prevent dust and/or liquid such as water from entering into the terminal port in the state where the cape is closed.

EMBODIMENTS

Hereinafter, an embodiment will be described in detail with reference to the drawings, appropriately. However, descriptions in detail more than necessary may be omitted. For example, matters which have been already well known may not be described in detail, and substantially the same configurations may not be described redundantly. This is for avoiding the following descriptions from being unnecessarily redundant and for allowing those skilled in the art to easily understand them.

Further, the present inventor(s) gives the accompanying drawings and the following descriptions for allowing those skilled in the art to sufficiently understand the present disclosure, and the main theme defined in the claims is not intended to be restricted thereby.

Further, in the following description, terms which denote certain directions (such as "upper", "lower", "left", "right" and other terms including these terms, "clockwise", "counterclockwise") may be used, but the use of them is merely for ease of understanding of the disclosure with reference to the drawings, and the present disclosure should not be restrictively understood by the meanings of these terms.

The embodiment of the present disclosure which will be described later is an example where the present disclosure is applied to a so-called tablet type portable information terminal device (hereinafter, appropriately referred to as a "tablet terminal device" or simply referred to as a "device").

Figure 2:
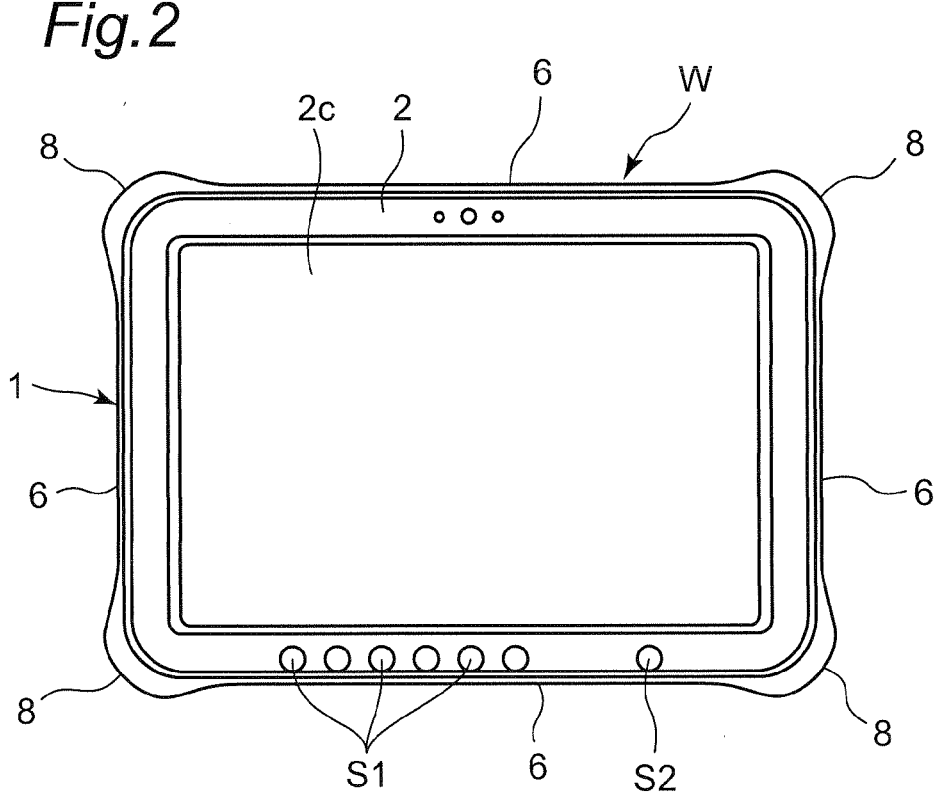
FIG. 2 is a plan view illustrating the tablet terminal device.
Figure 3:
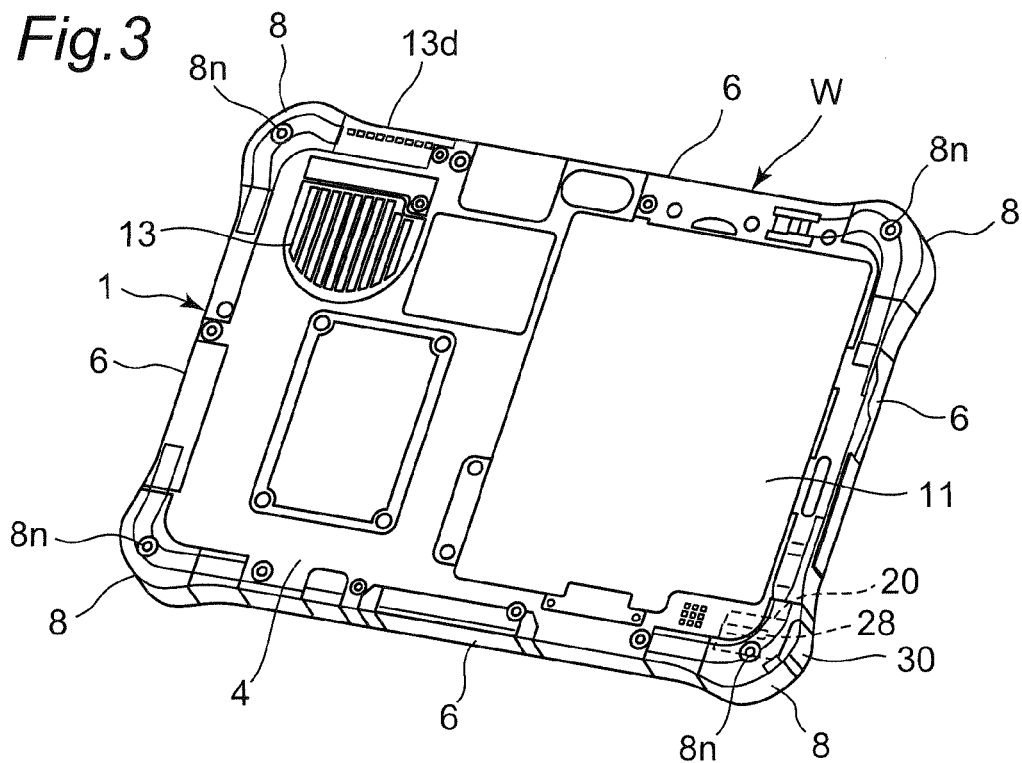
FIG. 3 is a perspective view illustrating the tablet terminal device on a back side.
Figure 4:
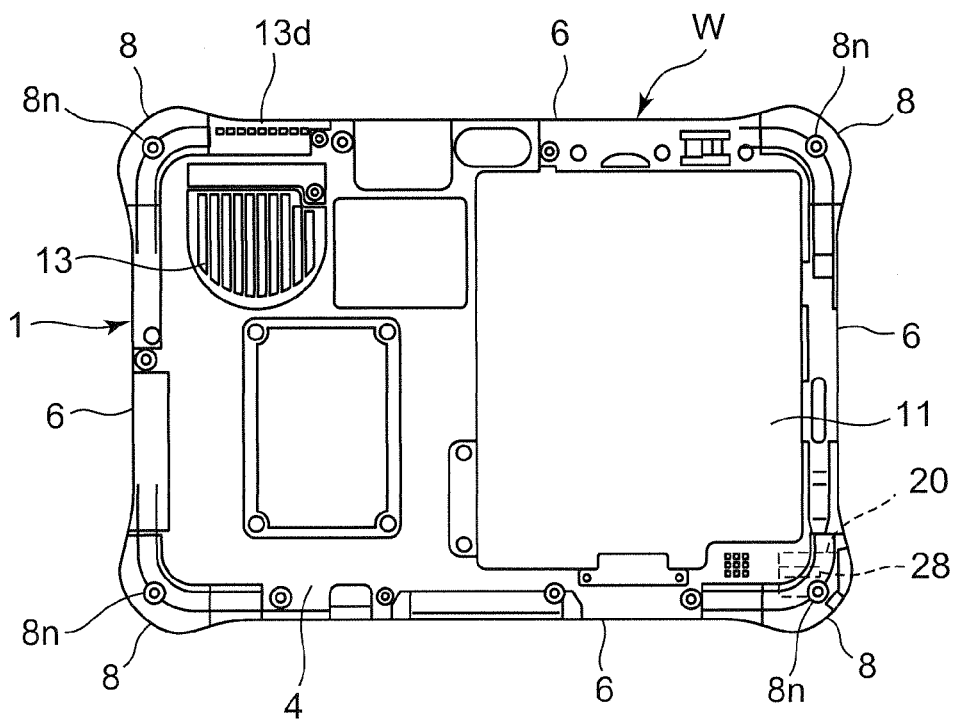
FIG. 4 is a rear view illustrating the tablet terminal device.

FIG. 1 and FIG. 2 are a perspective view and a plan view illustrating a tablet terminal device as the electronic device on a display screen side according to the present embodiment, respectively. Moreover, FIG. 3 and FIG. 4 are a perspective view and a plan view illustrating the tablet terminal device on the back side, respectively.

As illustrated in FIG. 1 to FIG. 4, a tablet terminal device W according to the present embodiment includes a casing 1 that is formed into a substantially quadrangular shape, as viewed on a plane, and has a predetermined thickness (i.e., a predetermined height). The casing 1 has, as its outer surface, an upper surface 2 and a lower surface 4 that are vertically disposed opposite to each other and a side surface 6 for connecting the peripheral edges of the surfaces 2 and 4 to each other. The side surfaces 6 are configured to have two pairs of substantially flat surfaces disposed opposite to each other as essential surfaces.

In the present embodiment, a bulge portion 8 bulging outward of the casing 1 in a curved manner is formed at each of corners of the casing 1, in order to enhance shock resistance when the device W falls down. Essential parts of the casing 1 are made of a metallic material such as magnesium (Mg) so as to secure mechanical rigidity or the like. The four bulge portions 8 are made of a material having a higher elasticity than that of the material of the casing 1, for example, an elastomer. These bulge portions 8 are attached to the corners of the Mg casing 1, and thus, are fixed to the casing 1.

The size and weight of the tablet terminal device W are set so as to ensure the portability thereof. A display screen 2c made of, for example, a liquid crystal is disposed at the upper surface 2 of the casing 1. The display screen 2c is also used as an input screen of a touch panel type. In the meantime, a battery pack 11 serving as a mobile power source is loaded at the lower surface 4 (i.e., a back side) of the casing 1. Various operation switches S1 and S2 are arranged on the upper surface 2 at the vicinity of the periphery (i.e. at the vicinity of the side surface 6).

A space (not shown) formed between the upper surface 2 and the lower surface 4 accommodates various electronic components (not shown) such as signal processing circuits and central processing units (CPUs), various control devices (not shown), and also various equipment such as a cooling fan 13. A ventilator 13*d* for the cooling fan 13 is provided at the side surface 6 of the casing 1.

In the present embodiment, a terminal port 20 provided with a connection terminal 28 for connecting with an external power supply (not shown) is arranged at a side surface 6 located at a vicinity of the corner of the casing 1, in a manner to avoid an interference with various electronic components (not shown), various control devices (not shown) and various equipment (not shown) accommodated inside the casing 1, and the battery pack 11 etc. loaded at the back side of the casing 1, further to avoid an interference with various components and various mechanism such as the aforementioned ventilator 13*d* for the cooling fan 13 provided at the side surface 6 of the casing 1. In other words, the terminal port 20 is provided to the bulge portion 8 made of elastomer. The terminal port 20 has an inner periphery formed into, for example, a round shape and opens outward of the casing 1.

Figure 5:
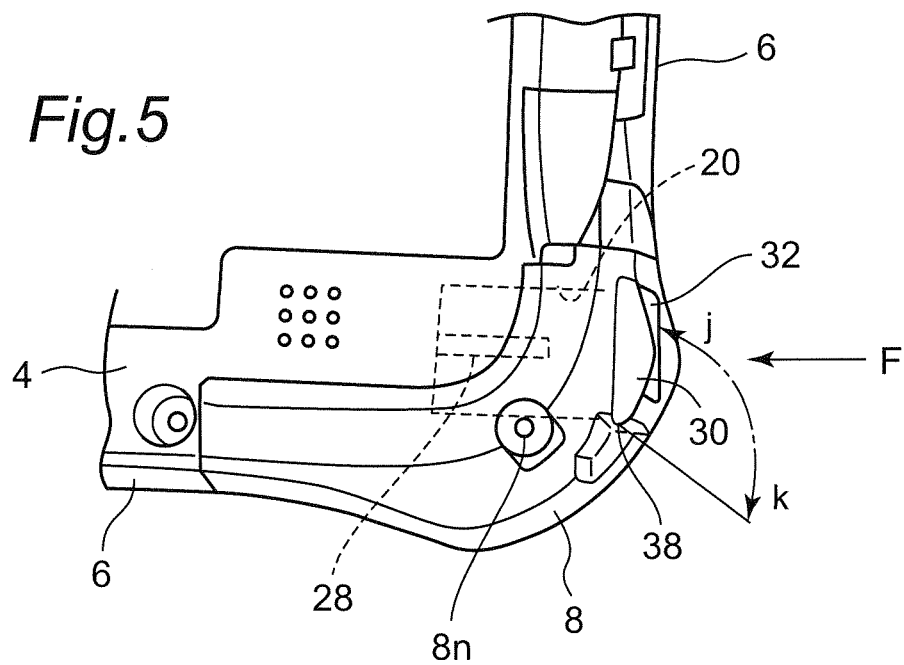
FIG. 5 is an enlarged perspective view illustrating a bulge portion at a corner of a casing provided with a terminal port for an external power supply of the tablet terminal device, as viewed on the back side.
Figure 6:
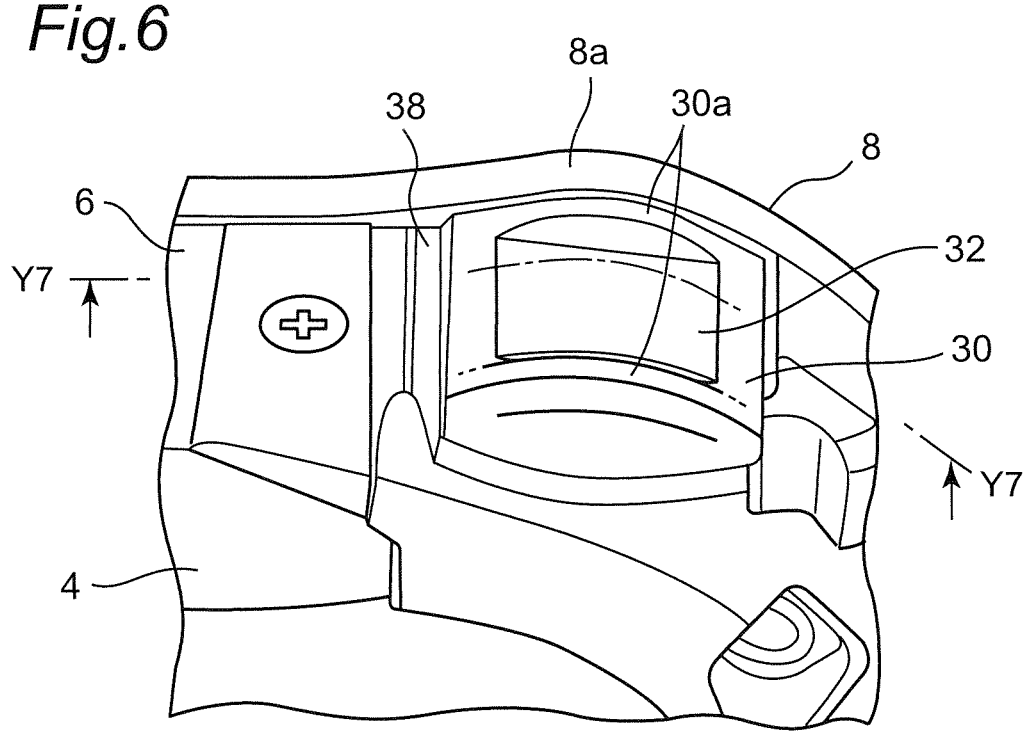
FIG. 6 is an enlarged perspective view illustrating the bulge portion, as viewed on obliquely downward.
Figure 7:
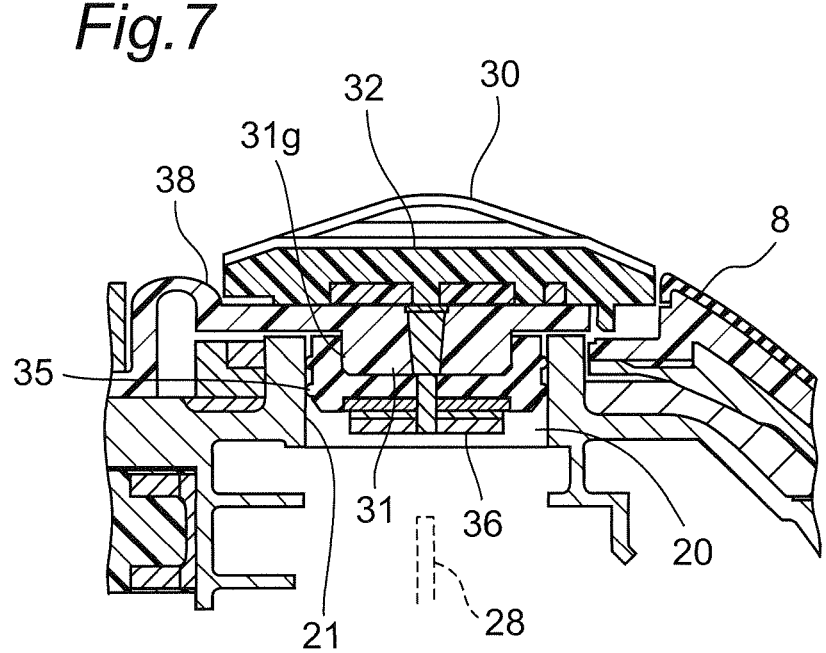
FIG. 7 is a transverse cross-sectional view taken along a line Y7-Y7 in FIG. 6.

FIG. 5 is an enlarged perspective view illustrating the bulge portion 8 at a corner of the casing 1 provided with the terminal port 20 for the external power supply of the tablet terminal device W, as viewed on the back side; and FIG. 6 is an enlarged perspective view illustrating the bulge portion 8, as viewed on obliquely downward. And, FIG. 7 is a transverse cross-sectional view taken along a line Y7-Y7 in FIG. 6.

As shown in these drawings, in the present embodiment, a cover member such as a cap 30 configured to cover the terminal port 20 in an openable and closable manner is provided to the side surface 6 of the casing 1, in order to prevent dust and/or liquid such as water from entering into the terminal port 20. And, in a state where the connection terminal 28 is not in use, the terminal port 20 is shielded against the outside by covering with the cap 30.

The cap 30 is integrally provided onto the side surface 6 of the casing 1 through a cap-turning support 38 (a hinge mechanism), and is configured to enable the turning operation for opening and closing the terminal port 20 as needed basis (refer to a dashed-line arrow jk in FIG. 5). In the present embodiment, the cap 30 and the hinge 38 for turning the cap 30 in the openable and closable manner with respect to the terminal port 20 are integrally molded, and the both are made of elastomer as same as the bulge portion 8 at the corner of the casing 1.

The cap includes a cylindrical fitting portion 31 capable of fitting into the inner periphery 21 of the terminal port 20, and a pressing surface 32 which is exposed on the side surface 6 of the casing 1. The pressing surface 32 of the cap 30 is formed as a surface perpendicular to a fitting direction of the cap 30 into the terminal port 20 (refer to the direction of an arrow F in FIG. 5).

According to the present embodiment, in the case where the cap configured to openably covers the terminal port 20 by a turning operation thereof is integrally provided onto the side surface 6 of the casing 1, in the electronic device W having a terminal port 20 opened outward at the side surface 6 of the casing 1, the cap 30 includes the fitting portion 31 capable of fitting into the terminal port 20, and the pressing surface 32 which is exposed on the side surface 6 of the casing 1.

And the pressing surface 32 of the cap 30 is formed as a surface perpendicular to a fitting direction of the cap 30 into the terminal port 20. Accordingly, when the cap 30 is pushed into the terminal port 20 by exerting a pushing force on the opened cap 30, a user can detect the suitable portion for exerting the pushing force without particularly realizing it. Thereby, it becomes possible to enhance the operability in turning operation of the cap 30 when the opened cap 30 is turned to close the terminal port 20.

It is to be noted that the cap-turning support 38 is not necessarily limited to those structured by a hinge mechanism. As the cap-turning support 38, a support member capable of supporting the cap 30 in an openable and closable manner may be good enough. For example, the cap-turning support may be configured to have a high elasticity enough to bend and/or fold within a range of the elasticity, and turning motion thereof may be achieved by bending and/or folding the elastic material.

A sealing member 35 for sealing the terminal port 20 of the casing 1 is disposed on an outer periphery 31*g* of the fitting portion 31 of the cap 30. The sealing member 35 is made of, for example, silicon rubber, and the outer periphery thereof is formed into a round annular shape. The sealing member 35 is fixed to the cap 30 by using a seal holder 36.

When the cap 30 closes the terminal port 20, the outer periphery of the sealing member 35 slidably contacts with the inner periphery 21 of the terminal port 20 while the outer periphery elastically deforms. Thereby, the terminal port 20 is air-tightly and liquid-tightly sealed against the outside. With this structure, it is possible, with the sealing member 35, to more reliably prevent dust and/or liquid such as water from entering into the terminal port 20 in the state where the cape 30 is closed.

A portion 8*a* located above and/or below the terminal port 20 (located above the terminal port 20, in the present embodiment) in the side surface 6 of the casing 1 constitutes a first protrusion 8*a* configured to outwardly protrude in an arc-like shape from the side surface 6 of the casing 1 more than the pressing surface 32 in a state where the cap 30 is closed. Further, a portion located above and/or below the pressing surface 32 (portions 30*a* and 30*a* located above and below the pressing surface 32, in the present embodiment) of the cap 30 constitute second protrusion 30*a* and 30*a* configured to outwardly protrude in an arc-like shape and in a same direction as that of the first protrusion 8*a* from the pressing surface 32 in a state where the cap 30 is closed. With this structure, since the second protrusions 30*a* and 30*a* are formed at the portions 30*a* and 30*a* located above and below the pressing surface 32 of the cap 30, the user's finger is to touch to the second protrusions 30*a* and 30*a* when the cap 30 is pushed into the terminal port 20 by exerting a pushing force on the opened cap 30 by the user's finger. Thereby, it becomes possible for the user to more easily detect the position of the pressing surface 32.

Furthermore, in this case, an outer surface of the first protrusion 8*a* and an outer surface of the upper second protrusion 30*a* constitute a substantially common outer surface in a state where the cap 30 is closed. That is, the outer surface of the first protrusion 8*a* located above the terminal port 20 and the outer surface of the second protrusion 30*a* located above the pressing surface 32 of the cap 30 exist in a substantially common curved surface in a state where the cap 30 is closed. Therefore, substantially no step is formed between the outer surface of the casing side and the outer surface of the upper side of the cap 30 in a state where the cap 30 is closed. Then, even when the pressing surface 32 is provided onto the cap 30, it is possible to suppress an adverse effect to the appearance of the electronic device W in the state where the cap 30 is closed.

Further, both the first protrusion 8a and the second protrusions 30a and 30a are made of elastomer which has a higher elasticity than that of the metal material (magnesium, for example) of other portions of the upper surface 2 or the lower surface 4 (the upper surface 2, in the present embodiment) of the casing 1. Thereby, it is possible to effectively absorb an impact force and enhance the impact resistance when the impact force is applied to the portion (the bulge portion 8) of the casing 1 to which the terminal port 20 and the cap 30 are provided.

As described above, the present embodiment has been described as an example of the technique of the present disclosure. For the purpose of this, the attached drawings and the detailed explanation have been provided.

As a consequence, the constituent elements in the attached drawings and the detailed explanation include not only constituent elements essential for solving a problem to be solved but also constituent elements that are just essential for illustrating the technique but inessential for solving a problem to be solved. Although such inessential constituent elements appear in the attached drawings and the detailed explanation, the inessential constituent elements are not regarded as being essential.

Although the above-described embodiment has been applied to the so-called tablet terminal device, the electronic device according to the present disclosure is not limited to this embodiment but can be effectively applied to other various kinds of electronic devices.

In this manner, the above-described embodiment is adapted only to illustrate the technique according to the present disclosure, and therefore, it can be variously changed, replaced, added, and omitted within the scope of claims or its equivalent scope.

INDUSTRIAL APPLICABILITY

The present disclosure is applicable to the electronic device that is provided with a terminal port at a side surface of the casing thereof.

What is claimed is:

1. An electronic device, comprising:
    a casing having, at an outer surface thereof, an upper surface and a lower surface that are disposed opposite to each other, and side surfaces for joining peripheral edges of the upper and lower surfaces;
    a terminal port disposed at a side surface of the casing and opened outward of the casing; and
    a cap configured to cover the terminal port in an openable and closable manner, wherein
    the cap includes a fitting portion capable of fitting into the terminal port, a pressing surface that is exposed on the side surface of the casing, and a cap-turning support configured to support the cap in the openable and closable manner with respect to the terminal port,
    the pressing surface of the cap is perpendicular to a fitting direction of the cap into the terminal port,
    a portion located directly above and/or below the terminal port in the side surface of the casing constitutes a first protrusion configured to protrude outwardly in an arc-like shape from the side surface of the casing and beyond the pressing surface when the cap is closed,
    a portion on the cap, located above and/or below the pressing surface of the cap, constitutes a second protrusion configured to protrude outwardly in an arc-like shape and in a same direction as that of the first protrusion and beyond the pressing surface when the cap is closed, a major length of the second protrusion extending between an end of the second protrusion disposed relatively nearer to the cap-turning support and an open end of the cap, the major length extending in a direction along the side surfaces that is parallel to the upper and lower surfaces, and
    an outer surface of the first protrusion and an outer surface of the second protrusion are flush such that the outer surface of the first protrusion and the outer surface of the second protrusion constitute a common outer surface in a state where the cap is closed.

2. The electronic device according to claim 1, wherein the first and the second protrusions are made of a material having a higher elasticity than that of a material of other portions of the upper surface or the lower surface of the casing.

3. The electronic device according to claim 1, wherein a sealing member for sealing the terminal port of the casing is disposed on an outer periphery of the fitting portion of the cap.

4. The electronic device according to claim 1, wherein the upper surface and the lower surface of the casing are respectively formed into a substantially quadrangular shape as viewed on a plane, and the side surfaces are configured to have two pairs of substantially flat surfaces disposed opposite to each other.

5. The electronic device according to claim 4, wherein each corner of the quadrangular shape is constituted by a bulge portion configured to bulge outward of the casing, and a part of the bulge portion constitutes the first protrusion.

* * * * *